United States Patent
Buchi et al.

(10) Patent No.: US 7,901,821 B2
(45) Date of Patent: Mar. 8, 2011

(54) STOPPING A FUEL CELL SUPPLIED WITH PURE OXYGEN

(75) Inventors: Félix Buchi, Lagenthal (CH); Gino Paganelli, Belfaux (CH); Akinori Tsukada, Kirchdorf AG (CH)

(73) Assignees: Conception et Developpement Michelin S.A., Givisez (CH); Paul Scherrer Institut, Villigen PSI (CH)

( * ) Notice: Subject to any disclaimer, the term of this patent is extended or adjusted under 35 U.S.C. 154(b) by 1080 days.

(21) Appl. No.: 11/658,199

(22) PCT Filed: Jun. 27, 2005

(86) PCT No.: PCT/EP2005/006890
§ 371 (c)(1),
(2), (4) Date: Jan. 22, 2007

(87) PCT Pub. No.: WO2006/012954
PCT Pub. Date: Feb. 9, 2006

(65) Prior Publication Data
US 2008/0038595 A1    Feb. 14, 2008

(30) Foreign Application Priority Data
Jul. 20, 2004  (FR) ..................... 04 08056

(51) Int. Cl.
*H01M 8/04*    (2006.01)
*B60L 11/18*   (2006.01)
(52) U.S. Cl. ......... 429/429; 429/431; 429/432; 429/444; 429/492

(58) Field of Classification Search ................. None
See application file for complete search history.

(56) References Cited

U.S. PATENT DOCUMENTS

| 4,226,919 A | 10/1980 | Stuwe |
| 5,200,278 A | 4/1993 | Watkins et al. |
| 5,346,778 A * | 9/1994 | Ewan et al. ............. 429/19 |
| 6,068,942 A | 5/2000 | Strasser et al. |
| 2001/0055707 A1 | 12/2001 | Roberts et al. |

FOREIGN PATENT DOCUMENTS

| DE | 100 59 393 A1 | 6/2002 |
| EP | 1 416 561 A | 5/2004 |
| JP | 01 128362 A | 5/1989 |
| JP | 02 033866 A | 2/1990 |

* cited by examiner

*Primary Examiner* — Robert Hodge
(74) *Attorney, Agent, or Firm* — Cohen Potani Lieberman & Pavane LLP

(57) ABSTRACT

A method for shutting down an electricity supply system comprising a fuel cell, the cell being supplied with pure oxygen as the combustive gas and delivering an electric voltage to an electric power line, the system comprising a fuel gas feed circuit on the anode side and an oxygen feed circuit on the cathode side, the oxygen feed circuit comprising means that enable the said oxygen feed circuit to be opened to the atmosphere and means for delivering a stop signal to a control unit of the fuel cell. The shutting down procedure is activated on reception of a stop signal and comprises an initial stage during which the supply of oxygen is interrupted, a consumption stage during which a sustained current is drawn from the fuel cell, a neutralisation phase during which the oxygen feed circuit is opened to the atmosphere, and a final stage during which the supply of hydrogen is interrupted.

8 Claims, 3 Drawing Sheets

STOPPING A FUEL CELL SUPPLIED WITH PURE OXYGEN

RELATED APPLICATION

This is a U.S. National Phase Application under 35 USC 371 of International Application PCT/EP2005/006890, filed on Jun. 27, 2005.

FIELD OF THE INVENTION

The present invention concerns fuel cells, in particular the automobile applications of fuel cells.

BACKGROUND OF THE INVENTION

As is known, fuel cells enable the direct production of electrical energy by an electrochemical redox reaction between hydrogen (the fuel) and oxygen (the combustion-supporting gas), without proceeding via conversion into mechanical energy. This technology seems promising in particular for automobile applications. A fuel cell generally comprises an association in series of unitary elements each consisting essentially of an anode and a cathode separated by a polymer membrane that enables ions to pass between the anode and the cathode.

As regards the fuel, either a supply of hydrogen is available or the hydrogen needed is produced near the fuel cell by a reformer itself supplied for example with a hydrocarbon. As regards the combustive gas, either the fuel cell is supplied with compressed atmospheric air and excess gas with a reduced oxygen content is discharged downstream from the cell, or the fuel cell is supplied with pure oxygen. This solution has some advantages, in particular a more dynamical response of the cell to a demand for current, which is advantageous in particular for applications in transport means such as automobiles, which are known to impose particularly intermittent operating conditions in contrast to static applications. Other advantages of feeding a fuel cell with pure oxygen which can be mentioned are that the efficiency and the power density are better, and there is no contamination by pollutants present in the atmospheric air.

In this case, however, the fuel cell does not stop operating immediately because one cannot take advantage of the asphyxiating effect of the nitrogen present in air. The electrochemical reaction cannot be interrupted totally by simply turning off the valves through which the fuel and combustive gases are supplied. In effect, the amounts of oxygen and hydrogen that remain trapped in the respective channels of the fuel cell suffice to maintain the electrochemical reaction and there is a risk that the reaction may continue for some hours. Consequently, there will still be an electric voltage across the terminals of the fuel cell.

This phenomenon has several disadvantages:
- the persisting electric voltage in itself harbours a risk for people, particularly if an intervention is needed around the fuel cell;
- the prolonged and uncontrolled discharge of the gases still present in the cell reduces the pressure in the gas circuits relative to atmospheric pressure and can give rise to pressure differences that may be harmful to the good mechanical condition of the elements of the fuel cell.

Patent application DE 100 59 393 describes a method for shutting down a fuel cell fed with hydrogen and pure oxygen. That patent application describes the following sequence: first, interruption of the oxygen supply, then use of a variable electric load to dissipate the electrical energy produced by the continuation of the reaction between hydrogen and oxygen in the fuel cell. Thus, when the oxygen pressure has fallen below a predetermined threshold value, the hydrogen and oxygen circuits are flushed with nitrogen to a predetermined pressure. This stops the operation of the fuel cell. However, that solution entails having a reserve of nitrogen. Moreover, the subsequent restarting of the fuel cell is inevitably interfered with by the presence of nitrogen in the gas circuits.

SUMMARY OF THE INVENTION

One object of the present invention is to achieve, without having recourse to a nitrogen supply, a controlled and rapid shut-down of the fuel cell, i.e. a cessation of the internal electrochemical processes such that the overall voltage across the terminals of the fuel cell effectively falls virtually to zero, and such that there is no further consumption of gas, and such that the cell is left in a condition favourable for a subsequent rapid start.

This and other objects are attained in accordance with one aspect of the present invention directed to a shut-down procedure for an electricity producing system that comprises a fuel cell which uses a polymer membrane as its electrolyte, the cell being supplied with pure oxygen as the combustive gas and delivering an electric voltage to an electric power line, the system comprising:
  a fuel gas feed circuit on the anode side; and
  an oxygen feed circuit on the cathode side, the oxygen feed circuit comprising means that enable the said oxygen feed circuit to be opened to the atmosphere;
  wherein the shut-down procedure comprises the following stages:
  an initial stage during which the supply of oxygen is interrupted,
  a consumption stage during which a sustained current is drawn from the fuel cell,
  a neutralisation phase during which the oxygen feed circuit is opened to the atmosphere,
a final stage during which the supply of fuel gas is interrupted.

In the remainder of this description the invention will be illustrated by considering a fuel cell of the type with an electrolyte in the form of a polymer membrane (i.e. of the PEFC—Polymer Electrolyte Fuel Cell—type). This is a favourable embodiment for applications in transport vehicles, in particular automobile vehicles, but is in no way limiting. A disadvantage of the fact that the shut-down of the cell is not immediate, is that the cooling system of the fuel cell should be kept active for a long time after the vehicle has been switched off, failing which there is a risk that hot spots harmful to the polymer membrane may appear. Moreover, the polymer membrane may turn out to be fairly sensitive to the pressure differences which risk appearing. The shut-down procedure proposed by the present invention is especially appropriate for eliminating these disadvantages for this type of fuel cell.

BRIEF DESCRIPTION OF THE DRAWINGS

The remainder of this description will bring out all the aspects of the invention, with reference to the attached drawings in which.

DETAILED DESCRIPTION OF THE DRAWINGS

Figure 2:
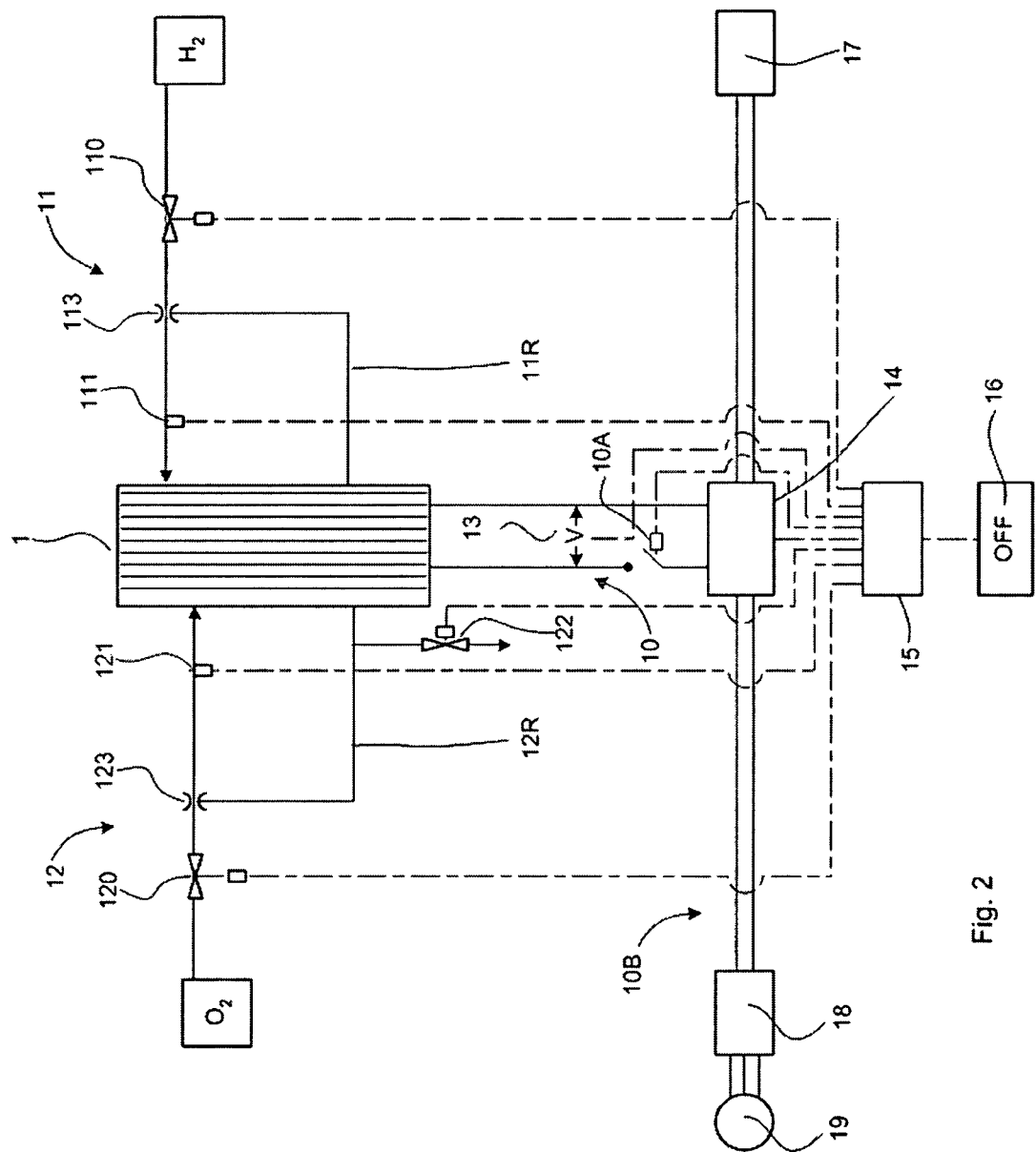
FIG. 2 is a schematic diagram of a vehicle provided with an electrical energy production system which uses a fuel cell supplied with pure oxygen.

FIG. 2 represents a fuel cell 1 of the type with an electrolyte in the form of a polymer membrane (i.e. of the PEFC—Polymer Electrolyte Fuel Cell—type). The fuel cell 1 is supplied with two gases, namely the fuel (hydrogen, stored or produced on board the vehicle) and the combustive gas (pure oxygen), which are fed to the electrodes of the electrochemical cells. For simplicity, FIG. 2 shows only those elements of the gas circuits that are useful for understanding the invention.

The installation comprises a fuel gas circuit on the anode side. A tank of pure hydrogen $H_2$ can be seen connected to the inlet of the anodic circuit of the fuel cell 1 by a feed pipe running via a hydrogen feed valve 110 and then an ejector 113. A pressure sensor 111 is fitted in the pipe just before the inlet to the fuel cell 1. A recycling circuit 11R is connected at the outlet of the anodic circuit of the fuel cell 1. The ejector 113 enables the unconsumed gases to be recycled and mixed in with the fresh gas coming from the tank.

The installation also comprises a combustive gas circuit 12 on the cathode side. A tank of pure oxygen $O_2$ can be seen connected to the inlet of the cathodic circuit of the fuel cell 1 by a feed pipe running via an oxygen feed valve 120 and then via an ejector 123. A pressure sensor 121 is fitted in the pipe just before the inlet to the fuel cell 1. A recycling circuit 12R is connected at the outlet of the cathodic circuit of the fuel cell 1. The ejector 123 enables the unconsumed gases to be recycled and mixed in with the fresh gas coming from the tank. Just at the outlet of the gases from the fuel cell 1 there is a purging valve 122 which enables the oxygen circuit to be opened to the atmosphere.

The fuel cell 1 is connected to an electric power line 10 to which it delivers a continuous voltage. A switch 10A can be seen, which enables the fuel cell to be isolated, and an electric load 10B is connected in the electric power line 10. The fuel cell 1 delivers a continuous electric current to an electric power management unit 14 (see FIG. 2). The continuous electric current delivered by the fuel cell is measured in the electric power management unit 14. The electric power management unit 14 is connected on the one hand to an electric traction module for an automobile vehicle, which consists essentially of a DC/AC converter 18 and an electric machine 19 mechanically coupled to a drive wheel or drive wheels (not shown) of an automobile vehicle. The electric power management unit 14 is also connected to an electrical energy storage device, preferably an array of super-condensers 17.

Accordingly, the fuel cell 1 can supply electricity to the electric traction module 18+19 or to the array of super-condensers 17, or both. The array of super-condensers 17 can receive electrical energy and store it, or it can deliver electrical energy to the electric traction module 18+19. As regards the latter, since the electric machine 19 is reversible it can absorb electrical energy to propel the vehicle or charge the array of super-condensers 17 in the electric braking mode of the vehicle. The electric power management unit 14 regulates the circulation of power as a function of commands from the driver of the vehicle and as a function of the condition of the electricity supply system. Of course, as it is known, the electrical equipment can certainly comprise other elements as well, such as an electric dissipation resistance; only those elements which are useful for understanding the invention have been mentioned above.

The fuel cell 1 is controlled by a control unit 15. This control unit 15 receives information from the pressure sensors in the hydrogen circuit (sensor 111) and in the oxygen circuit (sensor 121), from a voltage measuring device 13 in the electric power line 10, and from a starter element 16 (for example a contact key) for the shut-down procedure, and the control unit 15 controls the operation of the various valves (110, 120, 122).

Figure 1:
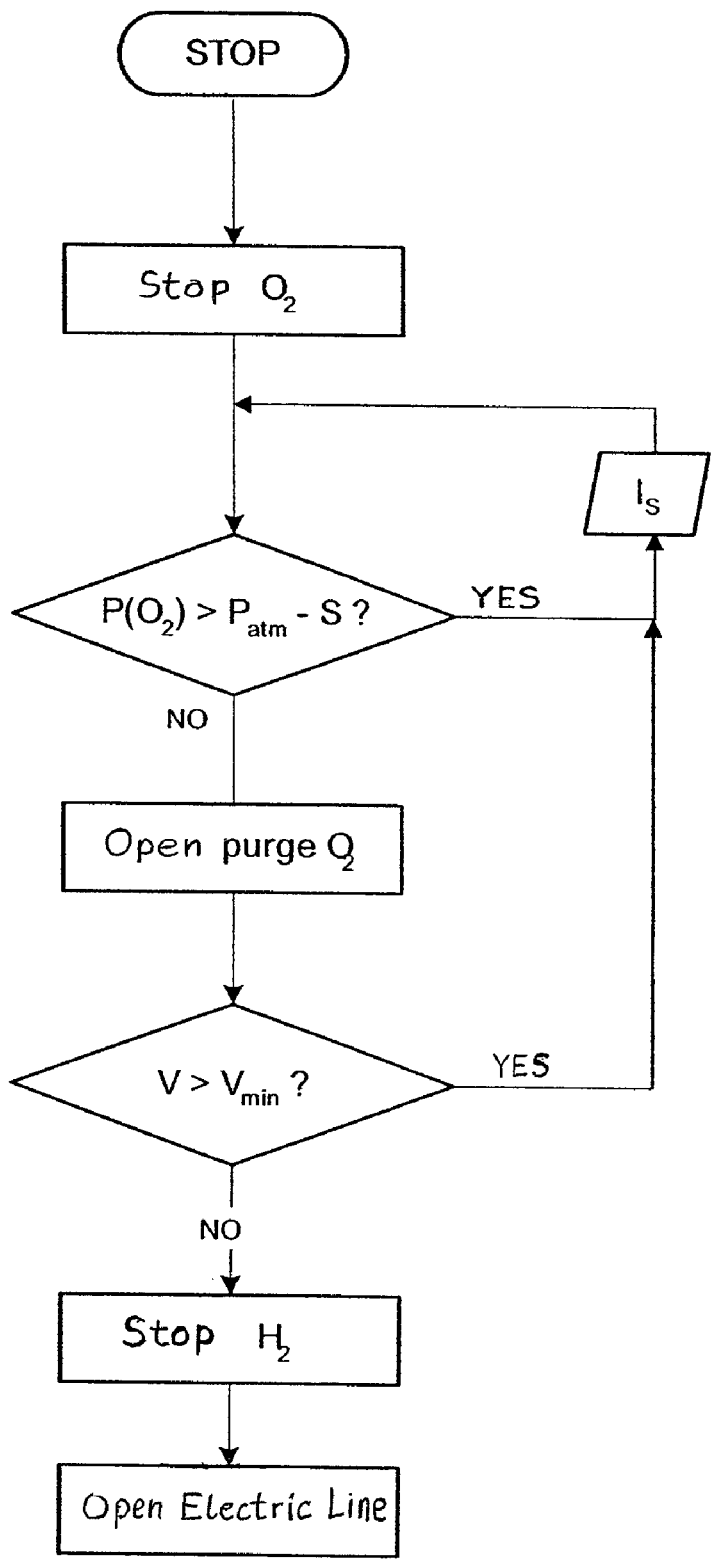
FIG. 1 is a flow-chart of the procedure for shutting down a fuel cell supplied with pure oxygen.

FIG. 1 illustrates the sequence of operations proposed in order to enable a well-controlled shut-down of the fuel cell 1. Via a key, switch, or any safety system that enables the monitoring of the vehicle, the driver sends to the control unit 15 a signal calling for the shut-down of the fuel cell. On receiving this stop signal, the first stage enables the oxygen feed valve to be closed. For that purpose the control unit 15 of the fuel cell 1 sends an electric signal to close only the oxygen feed valve 120. The supply of hydrogen is not cut off at this stage. FIG. 1 illustrates a particular control procedure for shutting down a fuel cell supplied with pure oxygen, in accordance with the invention, in which the action "stop $O_2$" represents this initial stage.

The consumption stage takes place at least while the voltage remains higher than a predetermined threshold value. The control unit 15 of the fuel cell 1 causes a current Is to be drawn off, which is small but sufficient to consume the gas remaining in the cell's channels, this being represented by the block Is in FIG. 1. If necessary the current Is can be adjusted as a function of the cell's condition (temperature, voltage distribution between all the unitary cells, etc.). The use of this current Is will be described later.

The neutralisation stage is preferably carried out as a succession of periods during which the oxygen circuit is briefly opened to the atmosphere and then isolated from the atmosphere again. Advantage is taken of the fact that the oxygen circuit is at a reduced pressure, to introduce ambient air in a natural way without having to compress it. The neutralisation phase begins as soon as the pressure in the oxygen circuit is lower than a comparison pressure $P_{atmo}-S$. It is proposed here that this comparison pressure is fixed at a level slightly below atmospheric pressure minus a chosen value S. Note that the consumption phase preferably takes place in such manner that it and the neutralisation phase are at least partially concomitant. When the condition that the oxygen circuit pressure is lower than the said comparison pressure is satisfied, and so long as the voltage V across the terminals of the fuel cell is above a threshold value $V_{min}$, this voltage being measured in the electric power line 10, the control unit 15 of the fuel cell 1 sends an electric signal to open the purge valve 122 and this is repeated several times if needs be, to draw air into the oxygen circuit. The air nitrogen introduced in this way into the oxygen circuit is enough to cause a sufficient acceleration of the cessation of electrochemical reaction, even if the asphyxiating effect is not as marked as would have been obtained with pure nitrogen. During this phase, a small continuous current has been drawn off, which is illustrated in FIG. 1 by the second loop.

Up to and including this phase a small amount of hydrogen continues to be supplied and regulated so that the pressure on the hydrogen side becomes 0 bar (relative pressure). Finally, when the voltage V across the terminals of the fuel cell is lower than the said threshold value $V_{min}$, the control unit 15 of the fuel cell 1 goes on to carry out the final stage: the hydrogen supply is interrupted. In effect, when the cell voltage has fallen to a sufficiently low level, the cell can be regarded as having been shut down. The current delivered to the electric load is preferably voluntarily interrupted just after the hydrogen feed has been cut off. For this, the control unit 15 of the fuel cell 1 opens the switch 10A during the final stage.

The hydrogen circuit is never opened to the atmosphere; it has been found that even if there is still some hydrogen left in the gas circuit on the anode side, the electrochemical reaction is stopped effectively with no stage of opening the fuel gas circuit on the anode side to the atmosphere. Another advantage of the shut-down procedure proposed by the invention is that after being shut down, the fuel cell remains in a configuration favourable for a rapid restart.

Figure 3:
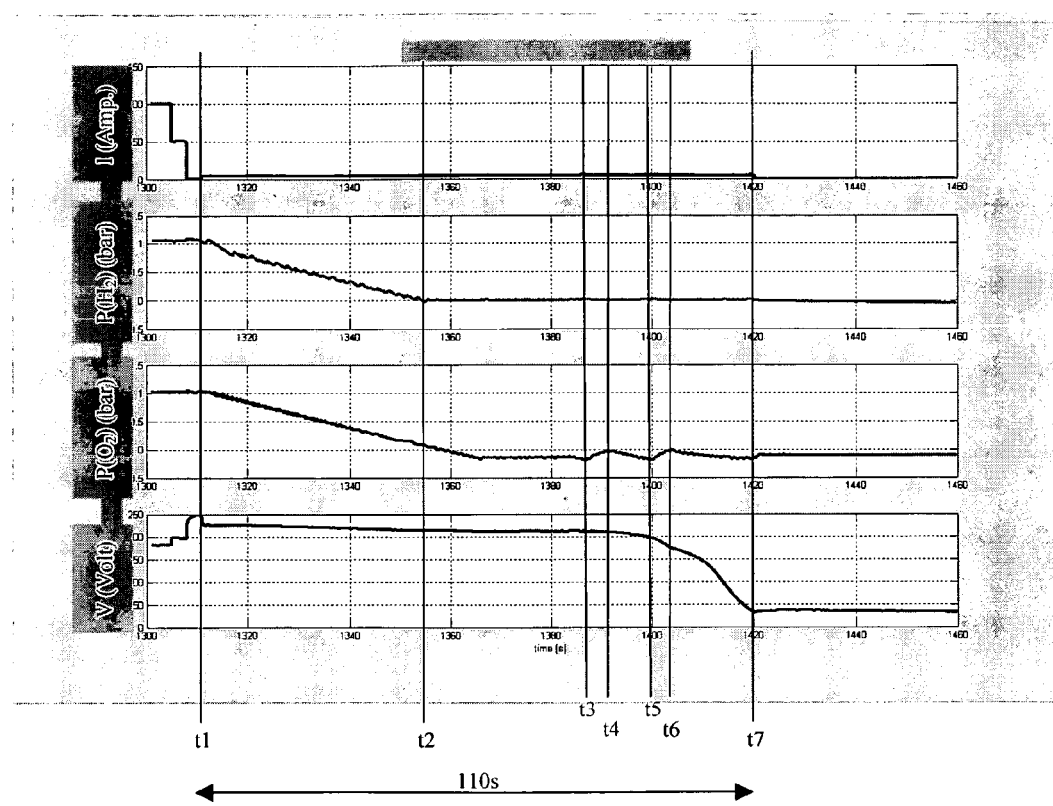
FIG. 3 shows a number of time charts illustrating the shutting down of a fuel cell supplied with pure oxygen.

The curves in FIG. 3 show the evolution of various parameters during the shutting down of the fuel cell 1 in accordance with this procedure, in the case of a 30 kW fuel cell with 250 active cells having unitary surface area 200 cm². The initial command for the shut-down process comes at t1 (initial stage). The first curve illustrates the evolution of the current measured in amperes in the electric power line 10; it can be seen that a small sustained current persists until t7 (final stage), at the moment when the hydrogen feed is cut off. At time t2 the oxygen pressure (third curve, showing $P(O_2)$ in bar) becomes lower than atmospheric pressure. In this particular case the oxygen circuit is opened to atmosphere twice, a first time between t3 (the moment when, or when for the first time, the $O_2$ pressure becomes lower than the said comparison pressure $P_{atmo}$–S) and t4, and then between t5 (the moment when, or when for the second time, the $O_2$ pressure becomes lower than the said comparison pressure $P_{atmo}$–S) and t6. In this example, this procedure enables the cell voltage to fall (see the fourth curve, showing the voltage V in the electric power line 10) from a nominal value of 250 V to a value below 30 V in a time of about 110 seconds. This time clearly depends on the value of the current Is drawn from the cell. The consumption phase takes place from t1 to t7. As for the neutralisation phase, this takes place from t3 to t6.

In that the proposed shut-down procedure for the fuel cell 1 assumes the absorption of an electric current during the shut-down, it is particularly advantageous, besides the fuel cell 1 itself, for the electricity supply system to comprise means 17 for the storage of electrical energy, and for the command to draw a small sustained current to switch the energy management unit into a mode in which the said electrical energy storage means 17 are recharged. In practice, the current is also used to maintain a supply to auxiliary equipment.

Since a continuous electric current has been absorbed by the electric load connected across the fuel cell 1, the consumption of gas leads to a decrease of the gas pressure on the oxygen side when the gas supply is cut off. Bearing in mind the stoichiometric relationship, the gas consumption is about twice as large on the hydrogen side. Preferably, to avoid the appearance of a large pressure difference between the hydrogen and oxygen circuits, the hydrogen pressure is adjusted so as to follow the oxygen pressure (see the second curve, which shows $P(H_2)$ in bar in FIG. 3). Care is taken, however, that the hydrogen pressure is never lower than atmospheric pressure, which is the pressure of the oxygen circuit at the end of the shut-down sequence. Moreover, this avoids any contamination of the hydrogen circuit with nitrogen.

If necessary, and preferably so that the vehicle will be stopped with the maximum electrical energy stored in its array of super-condensers, after actuating the shutting-down element but before closing the oxygen feed valve the charge level of the electrical energy storage means is checked and, if this is lower than an upper threshold value, the cell is kept in operation and the energy management unit is switched over to a mode in which the electrical energy storage means are recharged, and then, when the charge level is higher than or equal to the said upper threshold value, the oxygen feed valve is closed. This is very useful for the subsequent restarting of the vehicle.

The invention claimed is:

1. A method for shutting down an electricity supply system comprising a fuel cell, the cell being supplied with pure oxygen as the combustive gas and delivering an electric voltage to an electric power line, the system comprising:
   a fuel gas feed circuit on an anode side;
   an oxygen feed circuit on a cathode side;
   in the fuel gas feed circuit on the anode side, a feed valve and a pressure sensor fitted downstream from the feed valve;
   in the oxygen gas feed circuit, a feed valve and a pressure sensor fitted downstream from the feed valve, and a purge valve which enables the said oxygen feed circuit to be opened to the atmosphere; and
   a voltage measurement device in the said electric power line;
   wherein the shutting down method comprises the following stages:
   an initial stage during which the oxygen supply is interrupted;
   a consumption phase during which a sustained current is drawn off from the fuel cell;
   a neutralisation stage during which the oxygen feed circuit is opened to the atmosphere; and
   a final stage, during which the fuel gas supply is interrupted,
   wherein
   the initial stage enables the oxygen feed valve to be closed;
   the consumption phase takes place at least so long as the voltage is higher than a predetermined threshold value; and
   the neutralisation stage begins when the pressure in the oxygen circuit is lower than a comparison pressure and takes place as long as the voltage in the electric power line is higher than the said threshold value.

2. The shutting down method according to claim 1, in which the comparison pressure is lower than atmospheric pressure by a chosen value (S).

3. The shutting down method according to claim 1, in which the consumption phase and the neutralisation stage are at least partially concomitant.

4. The shutting down method according to claim 1, in which the neutralisation stage takes place in a succession of periods during which the oxygen circuit is briefly opened to the atmosphere and then isolated from the atmosphere again.

5. The shutting down method according to claim 1, wherein the system further comprises an electric power line comprising a switch, in which the switch is opened in the final stage when the fuel gas supply has been interrupted.

6. The shutting down method according to claim 1, a wherein the system further comprises a unit for the management of the electric power drawn from the cell and an electric load supplied via a power management unit and an electrical energy storage device, in which the consumption phase switches the energy management unit over to a mode in which the electrical energy storage device is recharged.

7. The shutting down method according to claim 6, a wherein the system comprising the electrical energy storage device comprises an array of super-condensers.

8. The shutting down method according to claim 6, in which, before beginning the initial stage, the charge level of the electrical energy storage device is checked and, if it is below an upper threshold value, the cell is kept in operation and the energy management unit is switched to a mode in which the electrical energy storage device is recharged, and when the charge level has become higher than or equal to the said upper threshold value, the initial stage is started.

* * * * *